United States Patent
Kim et al.

(10) Patent No.: US 10,697,521 B2
(45) Date of Patent: Jun. 30, 2020

(54) PLANETARY GEAR TRAIN OF AUTOMATIC TRANSMISSION FOR VEHICLE

(71) Applicants: Hyundai Motor Company, Seoul (KR); Kia Motors Corporation, Seoul (KR)

(72) Inventors: Jin Ho Kim, Suwon-si (KR); Jae Joon Lee, Anyang-si (KR); Jong Sool Park, Seongnam-si (KR); Kyeong Hun Lee, Seoul (KR); Jong Soo Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 32 days.

(21) Appl. No.: 16/197,169

(22) Filed: Nov. 20, 2018

(65) Prior Publication Data

US 2020/0003280 A1     Jan. 2, 2020

(30) Foreign Application Priority Data

Jul. 2, 2018    (KR) .................. 10-2018-0076650

(51) Int. Cl.
    *F16H 3/62*      (2006.01)
    *F16H 3/44*      (2006.01)
    *F16H 37/06*     (2006.01)

(52) U.S. Cl.
CPC ....... *F16H 3/62* (2013.01); *F16H 2200/0069* (2013.01); *F16H 2200/2015* (2013.01); *F16H 2200/2046* (2013.01)

(58) Field of Classification Search
CPC ................. F16H 2200/2015; F16H 2200/2046
See application file for complete search history.

(56) References Cited

U.S. PATENT DOCUMENTS

| | | | | |
|---|---|---|---|---|
| 3,433,094 A | * | 3/1969 | Phillips | F16H 3/66 475/59 |
| 3,815,445 A | * | 6/1974 | Gorrell | F16H 3/66 475/286 |
| 2014/0038766 A1 | * | 2/2014 | Koch | F16H 3/66 475/276 |
| 2018/0328464 A1 | * | 11/2018 | Kim | F16H 3/66 |

FOREIGN PATENT DOCUMENTS

| | | | | |
|---|---|---|---|---|
| DE | 2757799 A1 | * | 6/1978 | ............. F16H 3/666 |
| KR | 10-2017-0108440 A | | 9/2017 | |
| SU | 1597477 A1 | * | 10/1990 | ............... F16H 3/66 |
| SU | 1670248 A1 | * | 8/1991 | ............... F16H 3/66 |

* cited by examiner

*Primary Examiner* — Tisha D Lewis
(74) *Attorney, Agent, or Firm* — Morgan, Lewis & Bockius LLP

(57) ABSTRACT

A planetary gear train of an automatic transmission may include an input shaft receiving power, an output shaft outputting power, a first planetary gear set including first, second, and third rotation elements, a second planetary gear set including fourth, fifth and sixth rotation elements, a third planetary gear set including seventh, eighth and ninth rotation elements, a fourth planetary gear set including tenth, eleventh and twelfth rotation elements, a fifth planetary gear set including thirteenth, fourteenth and fifteenth rotation elements, and first to ninth shafts for connecting the rotation elements of the first to fifth planetary gear sets to each other.

16 Claims, 2 Drawing Sheets

FIG. 2

| SHIFT STAGE | ENGAGEMENT ELEMENT | | | | | | GEAR RATIO | INTER-STAGE RATIO |
|---|---|---|---|---|---|---|---|---|
| | CL1 | CL2 | CL3 | B1 | B2 | B3 | | |
| 1ST | | | O | O | | O | 6.097 | – |
| 2ND | | | | O | O | O | 4.078 | 1.495 |
| 3RD | | O | | | O | O | 3.008 | 1.356 |
| 4TH | | O | O | | | O | 2.153 | 1.397 |
| 5TH | O | O | | | | O | 1.685 | 1.278 |
| 6TH | O | | O | | | O | 1.253 | 1.345 |
| 7TH | O | O | O | | | | 1.000 | 1.253 |
| 8TH | O | | O | O | | | 0.846 | 1.182 |
| 9TH | O | | | O | O | | 0.706 | 1.198 |
| 10TH | O | O | | O | | | 0.646 | 1.093 |
| REV | | | O | | O | O | -4.443 | – |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2018-0076650, filed on Jul. 2, 2018, the entire contents of which is incorporated herein for all purposes by this reference.

BACKGROUND OF THE INVENTION

Field of the Invention

The present invention relates to a planetary gear train of an automatic transmission for a vehicle.

Description of Related Art

The multi-stage characteristic of a transmission is directed to improve the fuel efficiency of a vehicle by allowing an engine to operate in a more efficient range over the entire range of speed of the vehicle and to improve the drivability of the vehicle by promptly providing a more suitable shift ratio in a response to the driver's request.

To maximize the above effects of the multi-stage transmission, an inter-stage ratio, which is a difference in shift ratio between adjacent shifting stages, needs to be appropriately secured while increasing a gear ratio span, which is the total range of shift ratios that can be provided by the transmission. Furthermore, it is desirable that the inter-stage ratio be set as linearly as possible.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle, which is configured for securing an increased gear ratio span, a certain level or higher of inter-stage ratio and the linearity of the inter-stage ratio and securing improved durability due to a reduction in the torque which is borne by components while implementing ten forward shifting stages and one reverse shifting stage.

In accordance with an aspect of the present invention, the above and other objects may be accomplished by the provision of a planetary gear train of an automatic transmission for a vehicle including an input shaft receiving power, an output shaft outputting power, a first planetary gear set including first, second, and third rotation elements, a second planetary gear set including fourth, fifth and sixth rotation elements, a third planetary gear set including seventh, eighth and ninth rotation elements, a fourth planetary gear set including tenth, eleventh and twelfth rotation elements, a fifth planetary gear set including thirteenth, fourteenth and fifteenth rotation elements, a first shaft connected to the second rotation element, the sixth rotation element and the input shaft, a second shaft connected to the fourteenth rotation element and the output shaft, a third shaft connected to the third rotation element and the fifth rotation element, a fourth shaft connected to the fourth rotation element and the seventh rotation element, a fifth shaft connected to the eighth rotation element and the thirteenth rotation element, a sixth shaft connected to the eleventh rotation element and the fifteenth rotation element, a seventh shaft connected to the ninth rotation element and the tenth rotation element, an eighth shaft connected to the first rotation element, and a ninth shaft connected to the twelfth rotation element.

The planetary gear train may further include six engagement elements for selectively connecting shafts selected among the first shaft to the ninth shaft to each other or selectively connecting a transmission housing and shafts selected among the first shaft to the ninth shaft. Control may be performed such that three of the six engagement elements are simultaneously engaged to implement a specific one of forward and reverse shifting stages.

The six engagement elements may include three clutches, each selectively connecting two selected among the first shaft to the ninth shaft to each other, and three brakes, each selectively connecting a shaft selected among the first shaft to the ninth shaft, which is not connected to the input shaft or the output shaft, and the transmission housing.

The six engagement elements may include a first clutch provided between the second shaft and the third shaft, a second clutch provided between the first shaft and the fifth shaft, a third clutch provided between the fifth shaft and the eighth shaft, a first brake provided between the seventh shaft and the transmission housing, a second brake provided between the eighth shaft and the transmission housing, and a third brake provided between the ninth shaft and the transmission housing.

The first, second, and third rotation elements may be a first sun gear, a first planet carrier and a first ring gear, respectively. The fourth, fifth and sixth rotation elements may be a second sun gear, a second planet carrier and a second ring gear, respectively. The seventh, eighth and ninth rotation elements may be a third sun gear, a third planet carrier and a third ring gear, respectively. The tenth, eleventh and twelfth rotation elements may be a fourth sun gear, a fourth planet carrier and a fourth ring gear, respectively. The thirteenth, fourteenth and fifteenth rotation elements may be a fifth sun gear, a fifth planet carrier and a fifth ring gear, respectively.

The first planetary gear set, the second planetary gear set, the third planetary gear set, the fourth planetary gear set and the fifth planetary gear set may be disposed in that order in the direction oriented from one side to an opposite side thereof.

In accordance with another aspect of the present invention, a planetary gear train of an automatic transmission for a vehicle may include an input shaft and an output shaft, a first planetary gear set, a second planetary gear set, a third planetary gear set, a fourth planetary gear set, and a fifth planetary gear set, each being provided between the input shaft and the output shaft, and six engagement elements configured to provide frictional force in a variable manner, wherein each of the first planetary gear set to the fifth planetary gear set may include a first rotation element, a second rotation element and a third rotation element, and wherein the first rotation element of the first planetary gear set is mounted to be selectively fixed to a transmission housing and to be selectively connectable to the second rotation element of the third planetary gear set, the second rotation element of the first planetary gear set is directly connected to the input shaft and the third rotation element of the second planetary gear set and is mounted to be selectively connectable to the second rotation element of the third planetary gear set, the third rotation element of the first planetary gear set is directly connected to the second rotation element of the second planetary gear set, the first rotation element of the second planetary gear set is directly connected to the first rotation element of the third planetary gear set, the second rotation element of the second planetary gear set is mounted to be selectively connectable to the second rotation element of the fifth planetary gear set, the second rotation element of the third planetary gear set is directly connected to the first rotation element of the fifth planetary gear set, the third rotation element of the third planetary gear set is directly connected to the first rotation element of the fourth planetary gear set and is mounted to be selectively fixed to the transmission housing, the second rotation element of the fourth planetary gear set is directly connected to the third rotation element of the fifth planetary gear set, the third rotation element of the fourth planetary gear set is mounted to be selectively fixed to the transmission housing, and the second rotation element of the fifth planetary gear set is directly connected to the output shaft.

The input shaft and the output shaft may be coaxially disposed, and the first planetary gear set, the second planetary gear set, the third planetary gear set, the fourth planetary gear set and the fifth planetary gear set may be disposed in that order in the axial direction oriented from the input shaft to the output shaft.

The engagement elements may include a first clutch, a second clutch and a third clutch. The second rotation element of the second planetary gear set may be mounted to be selectively connectable to the second rotation element of the fifth planetary gear set by the first clutch, the second rotation element of the first planetary gear set may be mounted to be selectively connectable to the second rotation element of the third planetary gear set by the second clutch, and the first rotation element of the first planetary gear set may be mounted to be selectively connectable to the second rotation element of the third planetary gear set by the third clutch.

The engagement elements may further include a first brake, a second brake and a third brake. The third rotation element of the third planetary gear set may be mounted to be selectively fixed to the transmission housing by the first brake, the first rotation element of the first planetary gear set may be mounted to be selectively fixed to the transmission housing by the second brake, and the third rotation element of the fourth planetary gear set may be mounted to be selectively fixed to the transmission housing by the third brake.

Each of the first planetary gear set to the fifth planetary gear set is configured such that the first rotation element, the second rotation element and the third rotation element are disposed in that order in the radially outward direction from the rotation center thereof. In the first planetary gear set, the first rotation element may be a first sun gear, the second rotation element may be a first planet carrier, and the third rotation element may be a first ring gear. In the second planetary gear set, the first rotation element may be a second sun gear, the second rotation element may be a second planet carrier, and the third rotation element may be a second ring gear. In the third planetary gear set, the first rotation element may be a third sun gear, the second rotation element may be a third planet carrier, and the third rotation element may be a third ring gear. In the fourth planetary gear set, the first rotation element may be a fourth sun gear, the second rotation element may be a fourth planet carrier, and the third rotation element may be a fourth ring gear. In the fifth planetary gear set, the first rotation element may be a fifth sun gear, the second rotation element may be a fifth planet carrier, and the third rotation element may be a fifth ring gear.

In accordance with a further aspect of the present invention, a planetary gear train of an automatic transmission for a vehicle may include a first planetary gear set, a second planetary gear set, a third planetary gear set, a fourth planetary gear set, and a fifth planetary gear set, each including three rotation elements, six engagement elements configured to provide frictional force in a variable manner, and nine shafts connected to the rotation elements of the first planetary gear set to the fifth planetary gear set, the nine shafts including a first shaft directly connected to the second rotation element of the first planetary gear set, the third rotation element of the second planetary gear set and the input shaft, a second shaft directly connected to the second rotation element of the fifth planetary gear set and the output shaft, a third shaft directly connected to the third rotation element of the first planetary gear set and the second rotation element of the second planetary gear set, a fourth shaft directly connected to the first rotation element of the second planetary gear set and the first rotation element of the third planetary gear set, a fifth shaft directly connected to the second rotation element of the third planetary gear set and the first rotation element of the fifth planetary gear set, a sixth shaft directly connected to the second rotation element of the fourth planetary gear set and the third rotation element of the fifth planetary gear set, and a seventh shaft, an eighth shaft and a ninth shaft, each being mounted to be selectively fixed to a transmission housing.

The seventh shaft may be directly connected to the third rotation element of the third planetary gear set and the first rotation element of the fourth planetary gear set, the eighth shaft may be directly connected to the first rotation element of the first planetary gear set, and the ninth shaft may be directly connected to the third rotation element of the fourth planetary gear set.

The six engagement elements may include a first clutch provided between the second shaft and the third shaft, a second clutch provided between the first shaft and the fifth shaft, a third clutch provided between the fifth shaft and the eighth shaft, a first brake provided between the seventh shaft and the transmission housing, a second brake provided between the eighth shaft and the transmission housing, and a third brake provided between the ninth shaft and the transmission housing.

The first planetary gear set, the second planetary gear set, the third planetary gear set, the fourth planetary gear set and the fifth planetary gear set may be disposed in that order in the axial direction oriented from the input shaft to the output shaft.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation mode table of the planetary gear train shown in FIG. 1.

Figure 1:
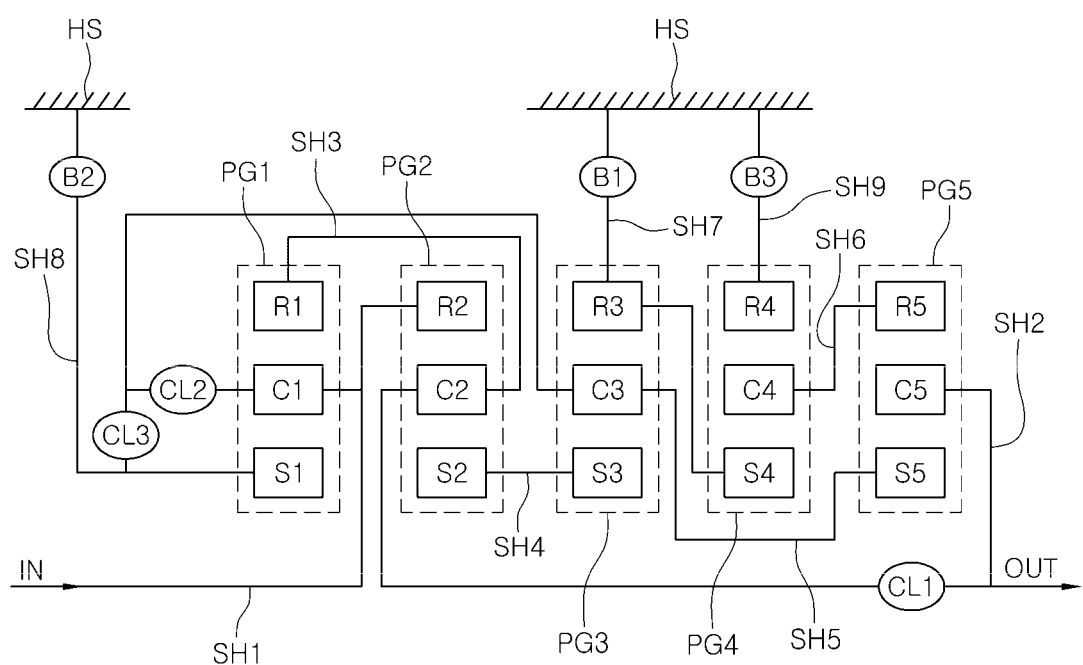
FIG. 1 is a view showing various exemplary embodiments of a planetary gear train of an automatic transmission for a vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Reference will now be made in detail to the exemplary embodiments of the present invention, examples of which are illustrated in the accompanying drawings.

Referring to FIG. 1, a planetary gear train of an automatic transmission for a vehicle according to an exemplary embodiment of the present invention includes an input shaft IN for receiving power from a power source such as an engine or the like, an output shaft OUT for outputting power, a first planetary gear set PG1 including first, second, and third rotation elements, a second planetary gear set PG2 including fourth, fifth and sixth rotation elements, a third planetary gear set PG3 including seventh, eighth and ninth rotation elements, a fourth planetary gear set PG4 including tenth, eleventh and twelfth rotation elements, and a fifth planetary gear set PG5 including thirteenth, fourteenth and fifteenth rotation elements.

The planetary gear train includes a first shaft SH1 connected to the second rotation element, the sixth rotation element and the input shaft IN, a second shaft SH2 connected to the fourteenth rotation element and the output shaft OUT, a third shaft SH3 connected to the third rotation element and the fifth rotation element, a fourth shaft SH4 connected to the fourth rotation element and the seventh rotation element, a fifth shaft SH5 connected to the eighth rotation element and the thirteenth rotation element, a sixth shaft SH6 connected to the eleventh rotation element and the fifteenth rotation element, a seventh shaft SH7 connected to the ninth rotation element and the tenth rotation element, an eighth shaft SH8 connected to the first rotation element, and a ninth shaft SH9 connected to the twelfth rotation element.

The first planetary gear set PG1, the second planetary gear set PG2, the third planetary gear set PG3, the fourth planetary gear set PG4 and the fifth planetary gear set PG5 are disposed in that order in the direction oriented from one side to the opposite side thereof.

The power source, such as an engine or the like, disposed in an engine side, is connected to the second rotation element of the first planetary gear set PG1 and the sixth rotation element of the second planetary gear set PG2 via the input shaft IN and the first shaft SH1 to supply power to the same. The power supplied as described above sequentially passes through the first planetary gear set PG1, the second planetary gear set PG2, the third planetary gear set PG3, the fourth planetary gear set PG4 and the fifth planetary gear set PG5 while appropriately shifting gears, and is then transmitted to the output shaft OUT via the fourteenth rotation element of the fifth planetary gear set PG5 and the second shaft SH2.

Each of the first planetary gear set PG1, the second planetary gear set PG2, the third planetary gear set PG3, the fourth planetary gear set PG4 and the fifth planetary gear set PG5, which form the planetary gear train, is a single pinion planetary gear set that includes three rotation elements.

The planetary gear train may be mounted in a transmission housing HS, a torque converter may be provided between the power source and the input shaft IN, and the power output from the output shaft OUT may be transmitted to the drive wheels via a differential.

The planetary gear train includes six engagement elements for selectively connecting shafts selected among the first to ninth shafts SH1 to SH9 to each other or selectively connecting the transmission housing and the shafts. The operation of the planetary gear train may be controlled such that three of the six engagement elements are simultaneously engaged to implement a specific one of the forward and reverse shifting stages.

That is, as shown in FIG. 2, to implement any one of the first to tenth forward shifting stages and one reverse shifting stage (i.e., an "R" range), three of the six engagement elements, which correspond to a requested shifting stage, are engaged.

Of course, the planetary gear train is configured to enable clutch-to-clutch shifting such that, when shifting to an adjacent shifting stage among the above shifting stages is performed, one of the three engagement elements required for the current shifting stage is disengaged and one of the three engagement elements required for the target shifting stage is engaged simultaneously therewith.

The six engagement elements include three clutches, each of which selectively connects two of the first to ninth shafts SH1 to SH9 to each other, and three brakes, each of which selectively connects a shaft selected among the first to ninth shafts SH1 to SH9, which is not connected to the input shaft IN or the output shaft OUT, and the transmission housing HS.

In the exemplary embodiment of the present invention, the six engagement elements include a first clutch CL1 provided between the second shaft SH2 and the third shaft SH3, a second clutch CL2 provided between the first shaft SH1 and the fifth shaft SH5, a third clutch CL3 provided between the fifth shaft SH5 and the eighth shaft SH8, a first brake B1 provided between the seventh shaft SH7 and the transmission housing HS, a second brake B2 provided between the eighth shaft SH8 and the transmission housing HS, and a third brake B3 provided between the ninth shaft SH9 and the transmission housing HS.

The first, second, and third rotation elements are a first sun gear S1, a first planet carrier C1 and a first ring gear R1, respectively. The fourth, fifth and sixth rotation elements are a second sun gear S2, a second planet carrier C2 and a second ring gear R2, respectively. The seventh, eighth and ninth rotation elements are a third sun gear S3, a third planet carrier C3 and a third ring gear R3, respectively. The tenth, eleventh and twelfth rotation elements are a fourth sun gear S4, a fourth planet carrier C4 and a fourth ring gear R4, respectively. The thirteenth, fourteenth and fifteenth rotation elements are a fifth sun gear S5, a fifth planet carrier C5 and a fifth ring gear R5, respectively.

The planetary gear train of an automatic transmission for a vehicle according to an exemplary embodiment of the present invention, configured as described above, implements the shifting stages according to the operation mode table shown in FIG. 2.

In the first forward shifting stage, the third clutch CL3, the first brake B1 and the third brake B3 are simultaneously engaged.

The power input to the input shaft IN and the first shaft SH1 is transmitted to the fifth shaft SH5 by the third clutch CL3, and is then transmitted to the fifth sun gear S5 of the fifth planetary gear set PG5. The seventh shaft SH7 and the fourth sun gear S4 of the fourth planetary gear set PG4 are maintained stationary by the first brake B1. The ninth shaft SH9 and the fourth ring gear R4 of the fourth planetary gear set PG4 are maintained stationary by the third brake B3.

Thus, the fourth planet carrier C4 is also maintained stationary, and consequently the sixth shaft SH6 and the fifth ring gear R5 of the fifth planetary gear set PG5 are also maintained stationary.

As a result, the power transmitted to the fifth sun gear S5 is transmitted to the output shaft OUT via the fifth planet carrier C5 and the second shaft SH2 in the state in which the fifth ring gear R5 is stationary, implementing the first shifting stage.

Shifting to the second shifting stage is implemented by disengaging the third clutch CL3 and engaging the second brake B2.

In the state in which the first sun gear S1 is maintained stationary by the second brake B2, the power of the input shaft IN is transmitted to the third sun gear S3 via the fourth shaft SH4 while being increased in speed. Since the third ring gear R3 is maintained stationary by the first brake B1, the power is transmitted to the fifth sun gear S5 via the third planet carrier C3 while being reduced in speed. As described above, since the fifth ring gear R5 is maintained stationary by the first brake B1 and the third brake B3, the power transmitted to the fifth sun gear S5 is transmitted to the output shaft OUT via the fifth planet carrier C5 and the second shaft SH2, implementing the second shifting stage.

Shifting to the third shifting stage is implemented by disengaging the first brake B1 and engaging the second clutch CL2.

The power of the input shaft IN is transmitted to the third planet carrier C3 and the fifth sun gear S5 via the second clutch CL2 and the fifth shaft SH5. Since the first sun gear S1 is maintained stationary by the second brake B2, a portion of the power is transmitted to the third sun gear S3 via the fourth shaft SH4 while being increased in speed. The power of the third sun gear S3 and the third planet carrier C3 drives the fourth sun gear S4 via the third ring gear R3. Since the fourth ring gear R4 is maintained stationary by the third brake B3, the power of the fourth sun gear S4 is transmitted to the fifth ring gear R5 via the fourth planet carrier C4 while being reduced in speed.

Therefore, in the fifth planetary gear set PG5, the fifth sun gear S5 and the fifth ring gear R5 receive the power, and the power for the third shifting stage is transmitted to the output shaft OUT via the fifth planet carrier C5.

As described above, by implementing the parallel torque method, in which the power is input to two rotation elements of a planetary gear set in parallel, it is possible to reduce the magnitude of torque which is borne by the rotation elements of the planetary gear set, improving the durability and efficiency of the constituent parts of the planetary gear train.

Shifting to the fourth shifting stage is implemented by disengaging the second brake B2 and engaging the third clutch CL3.

The power of the input shaft IN is transmitted to the first planetary gear set PG1 and the second planetary gear set PG2 via the first shaft SH1. As the result of engaging both the second clutch CL2 and the third clutch CL3, all of the rotation elements of the first planetary gear set PG1 are integrated, and accordingly all of the rotation elements of the second planetary gear set PG2 and all of the rotation elements of the third planetary gear set PG3 are also integrated.

Since the fourth ring gear R4 is maintained stationary by the third brake B3, the power, transmitted from the third ring gear R3 of the third planetary gear set PG3 to the fourth sun gear S4 via the seventh shaft SH7, is transmitted to the fifth ring gear R5 via the fourth planet carrier C4 and the sixth shaft SH6, and the power, transmitted from the second planetary gear set PG2 via the third shaft SH3, is transmitted to the fifth sun gear S5. That is, in the fifth planetary gear set PG5, the two rotation elements, namely the fifth sun gear S5 and the fifth ring gear R5, receive the power in parallel, and the power for the fourth shifting stage is transmitted to the output shaft OUT via the fifth planet carrier C5 and the second shaft SH2.

Shifting to the fifth shifting stage is implemented by disengaging the third clutch CL3 and engaging the first clutch CL1.

In the state in which the fourth ring gear R4 is maintained stationary by the third brake B3, the power input to the first shaft SH1 is transmitted to the fifth sun gear S5 via the second clutch CL2 and the fifth shaft SH5, and is also transmitted to the fifth planet carrier C5 and the output shaft OUT via the third shaft SH3 and the first clutch CL1, outputting the power for the fifth shifting stage.

Shifting to the sixth shifting stage is implemented by disengaging the second clutch CL2 and engaging the third clutch CL3.

In the state in which the fourth ring gear R4 is maintained stationary by the third brake B3, the power input to the first shaft SH1 is transmitted to the fifth sun gear S5 via the third clutch CL3 and the fifth shaft SH5, and is also transmitted to the fifth planet carrier C5 and the output shaft OUT via the third shaft SH3 and the first clutch CL1, outputting the power for the sixth shifting stage.

Shifting to the seventh shifting stage is implemented by disengaging the third brake B3 and engaging the second clutch CL2.

Since both the second clutch CL2 and the third clutch CL3 are engaged, the first sun gear S1 and the first planet carrier C1 of the first planetary gear set PG1 are locked to each other. Therefore, all of the rotation elements of the first planetary gear set PG1 are integrally locked. All of the rotation elements of the second planetary gear set PG2 are also integrally locked. All of the rotation elements of the third planetary gear set PG3 are also integrally locked.

Accordingly, the power from the first shaft SH1 is transmitted to the fifth sun gear S5 via the fifth shaft SH5, and is also transmitted to the fifth planet carrier C5 via the third shaft SH3. Since both the fifth sun gear S5 and the fifth planet carrier C5 are integrally locked, the power input to the input shaft IN and the first shaft SH1 is transmitted to the output shaft OUT at a shift ratio of 1:1, implementing the seventh shifting stage.

Shifting to the eighth shifting stage is implemented by disengaging the second clutch CL2 and engaging the first brake B1.

In the state in which the seventh shaft SH7 and the fourth sun gear S4, which are maintained stationary by the first brake B1, provide reaction force, the power of the first shaft SH1 is transmitted to the fifth sun gear S5 via the third clutch CL3 and the fifth shaft SH5, and is also transmitted to the fifth planet carrier C5 and the second shaft SH2 via the third shaft SH3 and the first clutch CL1, with the result that the power for the eighth shifting stage is transmitted to the output shaft OUT.

Shifting to the ninth shifting stage is implemented by disengaging the third clutch CL3 and engaging the second brake B2.

In the state in which the first sun gear S1 is maintained stationary by the second brake B2 and in which the fourth sun gear S4 is maintained stationary by the first brake B1, the power of the first shaft SH1 is transmitted to the second shaft SH2 and the fifth planet carrier C5 via the second planetary gear set PG2, the third shaft SH3 and the first clutch CL1, and is also transmitted to the fifth sun gear S5 via the fourth shaft SH4 and the fifth shaft SH5 while being reduced in speed, with the result that the power for the ninth shifting stage is transmitted to the output shaft OUT.

Shifting to the tenth shifting stage is implemented by disengaging the second brake B2 and engaging the second clutch CL2.

In the state in which the fourth sun gear S4 is maintained stationary by the first brake B1, the power of the first shaft SH1 is transmitted to the fifth sun gear S5 via the second clutch CL2 and the fifth shaft SH5, and is also transmitted to the second shaft SH2 and the fifth planet carrier C5 via the third shaft SH3 and the first clutch CL1, with the result that the power for the tenth shifting stage is transmitted to the output shaft OUT.

The reverse shifting stage (i.e., the "R" range) is implemented by engaging the third clutch CL3, the second brake B2 and the third brake B3.

In the state in which the second brake B2 is engaged, the eighth shaft SH8 and the fifth shaft SH5 are maintained stationary by the engagement of the third clutch CL3. In the present manner, the fifth sun gear S5 is maintained stationary. In the instant state, since the third planet carrier C3 is maintained stationary, the power transmitted to the fourth shaft SH4 via the second planetary gear set PG2 reversely rotates the third ring gear R3, and subsequently reversely rotates the fourth sun gear S4 via the seventh shaft SH7. Since the fourth ring gear R4 is maintained stationary by the third brake B3, the power of reversely rotating the fourth sun gear S4 is transmitted to the fifth ring gear R5 via the fourth planet carrier C4 and the sixth shaft SH6 while being reduced in speed. Subsequently, since the fifth sun gear S5 is maintained stationary, the power is transmitted to the output shaft OUT via the fifth planet carrier C5 while being further reduced in speed, implementing the reverse shifting stage.

The above-described present invention may be expressed as follows.

That is, the present invention includes: an input shaft IN and an output shaft OUT; a first planetary gear set PG1, a second planetary gear set PG2, a third planetary gear set PG3, a fourth planetary gear set PG4, and a fifth planetary gear set PG5, each being provided between the input shaft IN and the output shaft OUT; and six engagement elements configured to provide frictional force in a variable manner.

Each of the first to fifth planetary gear sets PG1 to PG5 includes a first rotation element, a second rotation element, and a third rotation element.

The first rotation element of the first planetary gear set PG1 is mounted to be selectively fixed to the transmission housing and to be selectively connectable to the second rotation element of the third planetary gear set PG3. The second rotation element of the first planetary gear set PG1 is directly connected to the input shaft IN and the third rotation element of the second planetary gear set PG2 and is mounted to be selectively connectable to the second rotation element of the third planetary gear set PG3. The third rotation element of the first planetary gear set PG1 is directly connected to the second rotation element of the second planetary gear set PG2.

The first rotation element of the second planetary gear set PG2 is directly connected to the first rotation element of the third planetary gear set PG3. The second rotation element of the second planetary gear set PG2 is mounted to be selectively connectable to the second rotation element of the fifth planetary gear set PG5.

The second rotation element of the third planetary gear set PG3 is directly connected to the first rotation element of the fifth planetary gear set PG5. The third rotation element of the third planetary gear set PG3 is directly connected to the first rotation element of the fourth planetary gear set PG4 and is also mounted to be selectively fixed to the transmission housing.

The second rotation element of the fourth planetary gear set PG4 is directly connected to the third rotation element of the fifth planetary gear set PG5. The third rotation element of the fourth planetary gear set PG4 is mounted to be selectively fixed to the transmission housing.

The second rotation element of the fifth planetary gear set PG5 is directly connected to the output shaft OUT.

The input shaft IN and the output shaft OUT are coaxially disposed. The first planetary gear set PG1, the second planetary gear set PG2, the third planetary gear set PG3, the fourth planetary gear set PG4 and the fifth planetary gear set PG5 are disposed in that order in the axial direction oriented from the input shaft IN to the output shaft OUT.

The second rotation element of the second planetary gear set PG2 is mounted to be selectively connectable to the second rotation element of the fifth planetary gear set PG5 by a first clutch CL1, among the engagement elements. The second rotation element of the first planetary gear set PG1 is mounted to be selectively connectable to the second rotation element of the third planetary gear set PG3 by a second clutch CL2, among the engagement elements. The first rotation element of the first planetary gear set PG1 is mounted to be selectively connectable to the second rotation element of the third planetary gear set PG3 by a third clutch CL3, among the engagement elements.

The third rotation element of the third planetary gear set PG3 is mounted to be selectively fixed to the transmission housing HS by a first brake B1, among the engagement elements. The first rotation element of the first planetary gear set PG1 is mounted to be selectively fixed to the transmission housing HS by a second brake B2, among the engagement elements. The third rotation element of the fourth planetary gear set PG4 is mounted to be selectively fixed to the transmission housing HS by a third brake B3, among the engagement elements.

Each of the first to fifth planetary gear sets PG1 to PG5 is configured such that the first rotation element, the second rotation element and the third rotation element are disposed in that order in the radially outward direction from the rotation center thereof.

In the first planetary gear set PG1, the first rotation element is a first sun gear S1, the second rotation element is a first planet carrier C1, and the third rotation element is a first ring gear R1. In the second planetary gear set PG2, the first rotation element is a second sun gear S2, the second rotation element is a second planet carrier C2, and the third rotation element is a second ring gear R2. In the third planetary gear set PG3, the first rotation element is a third sun gear S3, the second rotation element is a third planet carrier C3, and the third rotation element is a third ring gear R3. In the fourth planetary gear set PG4, the first rotation element is a fourth sun gear S4, the second rotation element is a fourth planet carrier C4, and the third rotation element is a fourth ring gear R4. In the fifth planetary gear set PG5, the first rotation element is a fifth sun gear S5, the second rotation element is a fifth planet carrier C5, and the third rotation element is a fifth ring gear R5.

Alternatively, the above-described present invention may also be expressed as follows.

The present invention includes: a first planetary gear set PG1, a second planetary gear set PG2, a third planetary gear set PG3, a fourth planetary gear set PG4, and a fifth planetary gear set PG5, each including three rotation elements; six engagement elements configured to provide frictional force in a variable manner; and nine shafts connected to the rotation elements of the first to fifth planetary gear sets.

The nine shafts include: a first shaft SH1 directly connected to the second rotation element of the first planetary gear set PG1, the third rotation element of the second planetary gear set PG2 and the input shaft IN; a second shaft SH2 directly connected to the second rotation element of the fifth planetary gear set PG5 and the output shaft OUT; a third shaft SH3 directly connected to the third rotation element of the first planetary gear set PG1 and the second rotation element of the second planetary gear set PG2; a fourth shaft SH4 directly connected to the first rotation element of the second planetary gear set PG2 and the first rotation element of the third planetary gear set PG3; a fifth shaft SH5 directly connected to the second rotation element of the third planetary gear set PG3 and the first rotation element of the fifth planetary gear set PG5; a sixth shaft SH6 directly connected to the second rotation element of the fourth planetary gear set PG4 and the third rotation element of the fifth planetary gear set PG5; and a seventh shaft SH7, an eighth shaft SH8 and a ninth shaft SH9, each being mounted to be selectively fixed to the transmission housing HS.

The seventh shaft SH7 is directly connected to the third rotation element of the third planetary gear set PG3 and the first rotation element of the fourth planetary gear set PG4. The eighth shaft SH8 is directly connected to the first rotation element of the first planetary gear set PG1. The ninth shaft SH9 is directly connected to the third rotation element of the fourth planetary gear set PG4.

The six engagement elements include: a first clutch CL1 provided between the second shaft SH2 and the third shaft SH3; a second clutch CL2 provided between the first shaft SH1 and the fifth shaft SH5; a third clutch CL3 provided between the fifth shaft SH5 and the eighth shaft SH8; a first brake B1 provided between the seventh shaft SH7 and the transmission housing HS; a second brake B2 provided between the eighth shaft SH8 and the transmission housing HS; and a third brake B3 provided between the ninth shaft SH9 and the transmission housing HS.

The first planetary gear set PG1, the second planetary gear set PG2, the third planetary gear set PG3, the fourth planetary gear set PG4 and the fifth planetary gear set PG5 are disposed in that order in the axial direction oriented from the input shaft IN to the output shaft OUT.

As is apparent from the above description, various aspects of the present invention are directed to providing a planetary gear train of an automatic transmission for a vehicle, which is configured for realizing a gear ratio span of 9.4 while implementing ten forward shifting stages and one reverse shifting stage, allowing an engine to primarily operate in a more efficient range and consequently improving the fuel efficiency of a vehicle.

Furthermore, the present invention is configured for realizing an inter-stage ratio of 1.093 or higher, and the linearity of the inter-stage ratio changes with the shifting stage change is ensured to be similar to the ideal tendency of change of the inter-stage ratio, improving the acceleration performance of a vehicle at the time of gear shifting, achieving a rhythmical engine speed, and consequently maximizing the drivability of a vehicle.

Furthermore, the present invention is configured for securing improved durability due to a reduction in the torque which is borne by components while securing an increased gear ratio span, a certain level or higher of inter-stage ratio and the linearity of the inter-stage ratio.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train apparatus of an automatic transmission for a vehicle, the planetary gear train apparatus comprising:
   an input shaft receiving power;
   an output shaft outputting power;
   a first planetary gear set including first, second and third rotation elements;
   a second planetary gear set including fourth, fifth and sixth rotation elements;
   a third planetary gear set including seventh, eighth and ninth rotation elements;
   a fourth planetary gear set including tenth, eleventh and twelfth rotation elements;
   a fifth planetary gear set including thirteenth, fourteenth and fifteenth rotation elements;
   a first shaft fixedly connected to the second rotation element, the sixth rotation element and the input shaft;
   a second shaft fixedly connected to the fourteenth rotation element and the output shaft;
   a third shaft fixedly connected to the third rotation element and the fifth rotation element;
   a fourth shaft fixedly connected to the fourth rotation element and the seventh rotation element;

a fifth shaft fixedly connected to the eighth rotation element and the thirteenth rotation element;
a sixth shaft fixedly connected to the eleventh rotation element and the fifteenth rotation element;
a seventh shaft fixedly connected to the ninth rotation element and the tenth rotation element;
an eighth shaft fixedly connected to the first rotation element; and
a ninth shaft fixedly connected to the twelfth rotation element.

2. The planetary gear train apparatus according to claim 1, further including:
six engagement elements for selectively connecting shafts selected among the first shaft, the third shaft, the fifth shaft, the seventh shaft, the eighth shaft and the ninth shaft to each other or selectively connecting a transmission housing and shafts selected among the first shaft, the fifth shaft, the seventh shaft, the eighth shaft and the ninth shaft
wherein three of the six engagement elements are, in combination of the three, engaged to implement a predetermined one of forward and reverse shifting stages.

3. The planetary gear train apparatus according to claim 2, wherein the six engagement elements comprise:
three clutches, each selectively connecting two shafts selected among the first shaft, the third shaft, the fifth shaft, and the eighth shaft to each other; and
three brakes, each selectively connecting a shaft selected among the first shaft, the fifth shaft, the seventh shaft, and the ninth shaft, which is not connected to the input shaft or the output shaft, and the transmission housing.

4. The planetary gear train apparatus according to claim 2, wherein the six engagement elements comprise:
a first clutch mounted between the second shaft and the third shaft;
a second clutch mounted between the first shaft and the fifth shaft;
a third clutch mounted between the fifth shaft and the eighth shaft;
a first brake mounted between the seventh shaft and the transmission housing;
a second brake mounted between the eighth shaft and the transmission housing; and
a third brake mounted between the ninth shaft and the transmission housing.

5. The planetary gear train apparatus according to claim 1,
wherein the first rotation element, the second rotation element, and the third rotation element are a first sun gear, a first planet carrier and a first ring gear, respectively,
wherein the fourth, fifth and sixth rotation elements are a second sun gear, a second planet carrier and a second ring gear, respectively,
wherein the seventh, eighth and ninth rotation elements are a third sun gear, a third planet carrier and a third ring gear, respectively,
wherein the tenth, eleventh and twelfth rotation elements are a fourth sun gear, a fourth planet carrier and a fourth ring gear, respectively, and
wherein the thirteenth, fourteenth and fifteenth rotation elements are a fifth sun gear, a fifth planet carrier and a fifth ring gear, respectively.

6. The planetary gear train apparatus according to claim 1, wherein the first planetary gear set, the second planetary gear set, the third planetary gear set, the fourth planetary gear set and the fifth planetary gear set are disposed in an order of the first planetary gear set, the second planetary gear set, the third planetary gear set, the fourth planetary gear set and the fifth planetary gear set in a direction oriented from one side to an opposite side thereof with respect to an engine side.

7. A planetary gear train apparatus of an automatic transmission for a vehicle, the planetary gear train apparatus comprising:
an input shaft and an output shaft;
a first planetary gear set, a second planetary gear set, a third planetary gear set, a fourth planetary gear set, and a fifth planetary gear set, each being mounted between the input shaft and the output shaft; and
six engagement elements configured to variably provide frictional force,
wherein each of the first planetary gear set to the fifth planetary gear set includes a first rotation element, a second rotation element and a third rotation element, and
wherein the first rotation element of the first planetary gear set is mounted to be selectively fixed to a transmission housing and to be selectively connectable to the second rotation element of the third planetary gear set,
wherein the second rotation element of the first planetary gear set is fixedly connected to the input shaft and the third rotation element of the second planetary gear set and is mounted to be selectively connectable to the second rotation element of the third planetary gear set,
wherein the third rotation element of the first planetary gear set is fixedly connected to the second rotation element of the second planetary gear set,
wherein the first rotation element of the second planetary gear set is fixedly connected to the first rotation element of the third planetary gear set,
wherein the second rotation element of the second planetary gear set is mounted to be selectively connectable to the second rotation element of the fifth planetary gear set,
wherein the second rotation element of the third planetary gear set is fixedly connected to the first rotation element of the fifth planetary gear set,
wherein the third rotation element of the third planetary gear set is fixedly connected to the first rotation element of the fourth planetary gear set and is mounted to be selectively fixed to the transmission housing,
wherein the second rotation element of the fourth planetary gear set is fixedly connected to the third rotation element of the fifth planetary gear set,
wherein the third rotation element of the fourth planetary gear set is mounted to be selectively fixed to the transmission housing, and
wherein the second rotation element of the fifth planetary gear set is fixedly connected to the output shaft.

8. The planetary gear train apparatus according to claim 7,
wherein the input shaft and the output shaft are coaxially disposed, and
wherein the first planetary gear set, the second planetary gear set, the third planetary gear set, the fourth planetary gear set and the fifth planetary gear set are disposed in an order of the first planetary gear set, the second planetary gear set, the third planetary gear set, the fourth planetary gear set and the fifth planetary gear set in an axial direction oriented from the input shaft to the output shaft.

9. The planetary gear train apparatus according to claim 8,
wherein the six engagement elements include a first clutch, a second clutch and a third clutch,
wherein the second rotation element of the second planetary gear set is mounted to be selectively connectable to the second rotation element of the fifth planetary gear set by the first clutch,
wherein the second rotation element of the first planetary gear set is mounted to be selectively connectable to the second rotation element of the third planetary gear set by the second clutch, and
wherein the first rotation element of the first planetary gear set is mounted to be selectively connectable to the second rotation element of the third planetary gear set by the third clutch.

10. The planetary gear train apparatus according to claim 9,
wherein the six engagement elements further include a first brake, a second brake and a third brake,
wherein the third rotation element of the third planetary gear set is mounted to be selectively fixed to the transmission housing by the first brake,
the first rotation element of the first planetary gear set is mounted to be selectively fixed to the transmission housing by the second brake, and
the third rotation element of the fourth planetary gear set is mounted to be selectively fixed to the transmission housing by the third brake.

11. The planetary gear train apparatus according to claim 10,
wherein each of the first planetary gear set to the fifth planetary gear set is configured such that the first rotation element, the second rotation element and the third rotation element in each of the first planetary gear set to the fifth planetary gear set are disposed in an order of the first rotation element, the second rotation element and the third rotation element in a radially outward direction from a rotation center thereof.

12. The planetary gear train apparatus according to claim 10,
wherein, the first rotation element of the first planetary gear set is a first sun gear, the second rotation element of the first planetary gear set is a first planet carrier, and the third rotation element of the first planetary gear set is a first ring gear,
wherein, the first rotation element of the second planetary gear set is a second sun gear, the second rotation element of the second planetary gear set is a second planet carrier, and the third rotation element of the second planetary gear set is a second ring gear,
wherein, the first rotation element of the third planetary gear set is a third sun gear, the second rotation element of the third planetary gear set is a third planet carrier, and the third rotation element of the third planetary gear set is a third ring gear,
wherein, the first rotation element of the fourth planetary gear set is a fourth sun gear, the second rotation element of the fourth planetary gear set is a fourth planet carrier, and the third rotation element of the fourth planetary gear set is a fourth ring gear, and
wherein the first rotation element of the fifth planetary gear set is a fifth sun gear, the second rotation element of the fifth planetary gear set is a fifth planet carrier, and the third rotation element of the fifth planetary gear set is a fifth ring gear.

13. A planetary gear train apparatus of an automatic transmission for a vehicle, the planetary gear train apparatus comprising:
a first planetary gear set, a second planetary gear set, a third planetary gear set, a fourth planetary gear set, and a fifth planetary gear set, each including three rotation elements having first, second, and third rotation elements;
six engagement elements configured to variably provide frictional force; and
first to ninth shafts connected to the three rotation elements of the first planetary gear set to the fifth planetary gear set,
wherein the first to ninth shafts comprise:
a first shaft fixedly connected to the second rotation element of the first planetary gear set, the third rotation element of the second planetary gear set and the input shaft;
a second shaft fixedly connected to the second rotation element of the fifth planetary gear set and the output shaft;
a third shaft fixedly connected to the third rotation element of the first planetary gear set and the second rotation element of the second planetary gear set;
a fourth shaft fixedly connected to the first rotation element of the second planetary gear set and the first rotation element of the third planetary gear set;
a fifth shaft fixedly connected to the second rotation element of the third planetary gear set and the first rotation element of the fifth planetary gear set;
a sixth shaft fixedly connected to the second rotation element of the fourth planetary gear set and the third rotation element of the fifth planetary gear set; and
a seventh shaft, an eighth shaft and a ninth shaft, each being mounted to be selectively fixed to a transmission housing.

14. The planetary gear train apparatus according to claim 13,
wherein the seventh shaft is fixedly connected to the third rotation element of the third planetary gear set and the first rotation element of the fourth planetary gear set,
wherein the eighth shaft is fixedly connected to the first rotation element of the first planetary gear set, and
wherein the ninth shaft is fixedly connected to the third rotation element of the fourth planetary gear set.

15. The planetary gear train apparatus according to claim 14, wherein the six engagement elements include:
a first clutch mounted between the second shaft and the third shaft;
a second clutch mounted between the first shaft and the fifth shaft;
a third clutch mounted between the fifth shaft and the eighth shaft;
a first brake mounted between the seventh shaft and the transmission housing;
a second brake mounted between the eighth shaft and the transmission housing; and
a third brake mounted between the ninth shaft and the transmission housing.

16. The planetary gear train apparatus according to claim 13, wherein the first planetary gear set, the second planetary gear set, the third planetary gear set, the fourth planetary gear set and the fifth planetary gear set are disposed in an order of the first planetary gear set, the second planetary gear set, the third planetary gear set, the fourth planetary gear set and the fifth planetary gear set in an axial direction oriented from the input shaft to the output shaft.

* * * * *